(12) United States Patent
Kristen et al.

(10) Patent No.: US 6,220,046 B1
(45) Date of Patent: Apr. 24, 2001

(54) EQUIPMENT FOR WORKING A HARD MATERIAL

(75) Inventors: Ferdinand Kristen, Gliching; Hans-Werner Bongers-Ambrosius, Munich, both of (DE); Josef Schitti, Thüringen; Erwin Reisinger, Seiersberg, both of (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 09/414,195

(22) Filed: Oct. 7, 1999

(30) Foreign Application Priority Data

Aug. 2, 1999 (DE) .............................................. 198 46 712

(51) Int. Cl.⁷ ................................................... F25D 23/12
(52) U.S. Cl. ........................................... 62/259.2; 62/434
(58) Field of Search .................................. 62/259.2, 430, 62/434, 331, 238.1, DIG. 10; 408/1 R

(56) References Cited

U.S. PATENT DOCUMENTS

| | | | |
|---|---|---|---|
| 4,095,916 | * | 6/1978 | Hammond ............................ 408/1 R |
| 4,676,319 | * | 6/1987 | Cuthbertson ............................ 169/70 |
| 5,474,120 | * | 12/1995 | Severson et al. ....................... 165/39 |
| 5,951,217 | * | 9/1999 | Ostermeier et al. .................... 408/59 |
| 6,113,320 | * | 9/2000 | Ostermeier et al. .................... 408/56 |

* cited by examiner

Primary Examiner—William Doerrler
Assistant Examiner—Melvin Jones
(74) Attorney, Agent, or Firm—Brown & Wood, LLP

(57) ABSTRACT

Equipment for working a hard material includes a housing (2), a driving motor (1), located within the housing, a cooling duct (3) within the housing surrounding the driving motor, a tool (5) for working the hard material connected to the driving motor and at least one electronic component (19) mounted on a cooling device (8). A coolant supply source (6) supplies coolant under pressure to the cooling device (8) and then to an upstream end of the cooling duct (3). A first coolant discharge pipeline (13) is connected to a downstream end of the cooling duct (3). The first coolant discharge pipeline (13) flows the coolant into a reversible distributor (10). A second and a third coolant discharge pipeline (11, 12) extend from the reversible distributor (10) so that selectively all of the coolant can flow through the second coolant discharge pipeline (11) to the tools (5) or all of the coolant can flow through the third coolant discharge pipeline (12) to the coolant supply source or a part of the coolant can flow through each of the second and third coolant discharge pipelines. To operate the equipment if coolant flows through the cooling device (8), a flow monitor (14) detects the movement of coolant and sends an electronic signal to the electronic component (19). The power is supplied from an external power source to the driving motor (1) only when the flow monitor (14) signals that coolant is flowing.

10 Claims, 1 Drawing Sheet

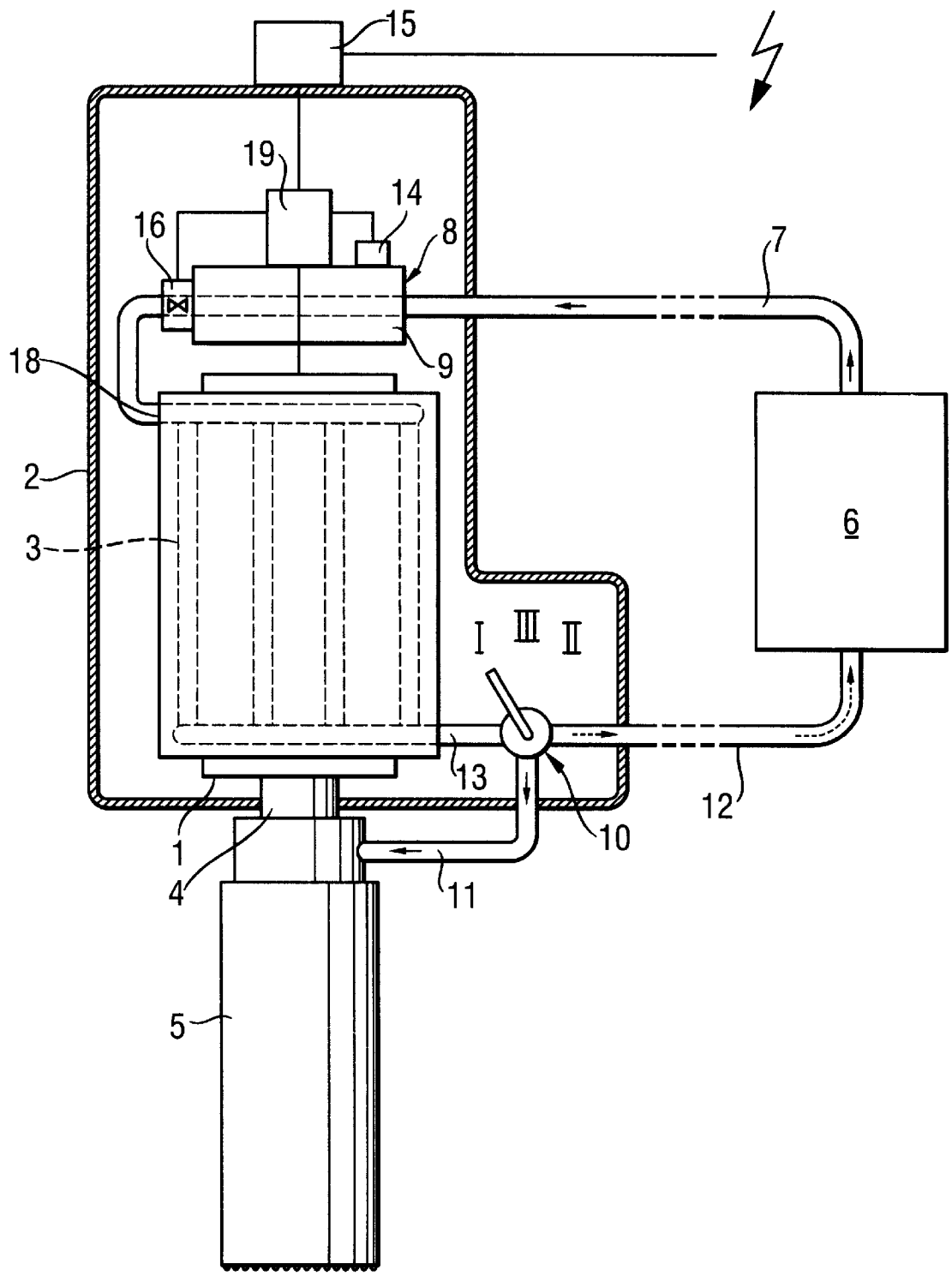

EQUIPMENT FOR WORKING A HARD MATERIAL

BACKGROUND OF THE INVENTION

The present invention is directed to an equipment for working a hard material and includes a housing, a driving motor located within the housing, a tool connected to the driving motor and arranged to work the hard material, a cooling duct located within the housing in a region about the driving motor. A coolant supply source supplies coolant under pressure via a coolant supply pipeline to the coolant duct. After flow through the coolant duct, coolant passes into a coolant discharge pipeline.

To produce boreholes or openings in hard materials, drilling or cutting equipment is used including tools tipped with cutting segments formed of diamond particles. Such equipment must perform differently, depending on the hardness of the material or the depth of the borehole or cuts to be produced. Particularly in high-powered equipment, heat is developed in the drilling or cutting process in the region of the driving motor and in the region of the associated electronic components and can lead to interference with the control of the equipment. In the region of components for controlling the equipment, including at least one electronic component, high temperatures can be produced by heat accumulation, by surrounding high temperatures or by inadequate ventilation of the electronic component if it happens to be covered with dust, or its ventilation slots are closed off almost completely by dust accumulation, so that surrounding cooling air can no longer reach the electronic component.

To dissipate the heat developing in the region of a driving motor while working a hard material, drilling equipment with a drilling motor is disclosed in DE 43 30 520 in connection with a drilling tool, a part of the housing, surrounding the driving motor, being traversed by a cooling duct running spirally from an inlet, located opposite the drilling direction, over the entire driving motor to an outlet on the drilling side. A coolant is passed through the cooling duct under pressure from an external coolant supply source and is supplied to the inlet by a coolant supply pipeline. A coolant discharge pipeline extends from the outlet from the cooling duct to the drilling tool. Aside from cooling the drilling tool, the coolant supplied through the coolant discharge pipeline to the drilling tool also serves to flush drillings out of the drilled borehole and in certain applications, coolant must be prevented from reaching the drilling tool. In such a case, the coolant discharge pipeline connects the cooling duct outlet with the coolant supply source.

In the drilling equipment disclosed in the DE 43 30 520, only the driving motor is cooled with coolant. In the region of the electronic components, however, which controls the driving motor, heat can increase greatly and lead to interference with the control of the drilling equipment.

SUMMARY OF THE INVENTION

It is a primary object of the present invention to provide equipment for working hard material, even when a high load is imposed on the equipment, when the surrounding temperature is high and when the surroundings are extremely dusty for affording optimum cooling for the electronic components involved.

In accordance with the present invention the equipment is distinguished in that the pipeline supplying the coolant flows through a cooling device which effects cooling of at least one electronic component.

Since the cooling device interacting with the electronic component is located in the pipeline supplying the coolant, the coolant under pressure flows from the coolant supply source first through the cooling device and subsequently through the cooling duct for the driving motor. Preferably, the cooling device is formed of at least one basic member having good thermal conductivity properties and on which the electronic component is positioned. The basic member is formed of aluminum, it has a continuous duct through which the coolant flows and, at the same time, dissipates heat generated by the electronic component or which is developed by the atmosphere surrounding the basic member.

To provide equipment capable of easy handling, preferably the cooling device is positioned in the equipment housing. The cooling device is connected with the cooling duct of the driving motor by the coolant supplied pipeline.

To determine if the coolant is circulating or flowing throughout the cooling system, composed essentially of the coolant supply source, the coolant supply pipeline, the cooling device, the cooling duct and a coolant discharge passageway, preferably the cooling device works in combination with a flow monitor.

Since the electronic component is sensitive to high temperatures, it must be insured that the coolant flows through a basic member connected with the electronic component before the driving motor controlled by the electronic component is started up whereby, as a result, initially the electronic component is strongly heated. Accordingly, the flow monitor interacts with the electronic component. As an example, the flow monitor is a magnetic switch, which can be operated by the circulating coolant under pressure, against force of a spring, and in an end position the magnetic switch, by means of a signal, informs the electronic component of the coolant circulation in the coolant system. When such signal reaches the electronic component, the driving motor can be started up. The absence of the signal to the magnetic switch indicates that the coolant is not circulating in the cooling system and the cooling device is not being cooled.

To prevent coolant draining from the cooling duct of the driving motor, when the equipment is not in operation, the cooling device advantageously interacts with a shut-off valve, so that the supply of coolant to the driving motor can be controlled.

For selectively directing the coolant, passing through the coolant discharge pipeline, a reversible distributor is provided so that the coolant can be supplied either to the drilling tool or to the coolant supply source. From the reversible distributor the coolant can take separate branches of the coolant discharge pipeline, one branch being connected to the tool and the other to the coolant supply source.

A portion of the coolant can be directed to the tool and another portion to the coolant supply source with the two portions each preferably being fifty percent of the coolant, so that the reversible distributor preferably has three switching positions. In a first switching position, all of the coolant is directed over a first branch to the tool, in a second branch all of the coolant is supplied to a coolant supply source and, in a third switching position, the cooling is supplied both to the tool and to the cooling supply source.

If the equipment is used at a site where fresh water, serving as coolant, is not available from a local water supply system, advantageously the coolant supply source is formed by coolant processing equipment made up of a coolant tank, a device for cooling, cleaning and/or filtering the coolant and a pump, so that the coolant can be directed under pressure to the cooling duct.

For easy handling of the equipment by the operator, the coolant processing equipment is preferably disposed in spaced relation to the housing.

The invention will now be explained in greater detail with the reference to the drawings, showing an embodiment example of the invention. In the drawing:

BRIEF DESCRIPTION OF THE DRAWING

The drawing is a diagrammatic view of the equipment embodying the present invention.

DETAILED DESCRIPTION OF THE INVENTION

As shown in the drawing, the equipment for working a hard material is a drilling equipment with a housing 2 enclosing a driving motor 1 with a tool 5 mounted on a tool spindle 4 for the drilling equipment. The tool spindle 4 extends outwardly from the housing 2 where it is connected to the tool 5. A coolant supply source 6, spaced from the housing 2, is in the form of a coolant processing equipment, so that the coolant can be supplied under pressure to a cooling duct 3 located in the housing 2 and surrounding the driving motor 1. The coolant supply source 6 may be a local water supply system using fresh water under pressure as the coolant. The cooling duct 3, shown in phantom, has an upstream end as viewed in the drawing where it has a ring-shaped member in the region of an upstream end or inlet 18 and an outlet at the downstream end, that is the lower end as viewed in the drawing. Between the ring-shaped members located at the inlet 18 and at the outlet there are several passageways extending parallel to one another and spaced from one another. The rotor and other important parts of the driving motor are not shown in the simplified drawing.

The tool spindle 4 is formed by a part of the motor shaft of the driving motor 1. It may, however, also be a part of a gear arrangement disposed between the driving motor 1 and the tool 5. Tool 5 is composed of a shank of the drill, not shown, and can be coupled with the tool spindle extending in the drilling direction and in the form of a tubular body which at a lower or free end has several cutting segments tipped with diamond particles. The coolant supply source includes a cooling tank, a device for cooling, cleaning and/or filtering a coolant, and a pump for supplying the coolant under pressure to the cooling duct 3. The cooling tank, the device for cooling, cleaning and/or filtering and the pumps are not shown in the drawing.

A coolant supply pipeline 7 carries the coolant from the coolant supply source 6 and delivers it into the upstream end or inlet 18 of the cooling duct 3. Within the housing 2 upstream of the cooling duct 3 is a cooling device 8 on which an electronic component 19 is mounted. The cooling device 8 includes a basic member 9 formed of a material with good thermal conductivity properties. The basic member 9 includes a duct through which the coolant flows from the coolant supply source to the cooling duct 3. Because of the good thermal conductivity properties of the member 9, heat developing in the region of the electronic component 19 is absorbed by the member 9 and dissipated from it by the cold coolant.

In the coolant supply pipeline 7, in the region of the cooling device 8, a flow monitor 14 is located which makes it possible to check whether the coolant is flowing in the pipeline 7.

As shown in the drawing, the flow monitor 14, the driving motor 1 and a control switch 15 are connected to the electronic component 19 controlling the equipment. The power is supplied to the electronic component 19 by a control switch 15 connected to an external power supply. The electronic component 19 is an electronic control system, which in addition to the driving motor can also control the coolant supply source 6.

The electronic component 19 is sensitive to high temperatures and high temperature fluctuations. As a result, is must be cooled at a point in time before the driving motor 1 is started up. To achieve the appropriate cooling, the flow monitor 14, when the control switch 15 is activated initially checks whether coolant is flowing in the supply coolant pipeline 7. If coolant is flowing, the current of the external power supply passes through the control switch and reaches the electronic component 19 and then passes on to the driving motor 1 so that the driving motor starts to run. If the coolant is not flowing in the pipeline 7, then the electronic component does not conduct power from the external power source to the driving motor 1.

At the outlet or downstream end of the coolant duct 3 the coolant flows into a coolant discharge pipeline 13 and then into a reversible distributor 10. Considering the coolant pipeline 13 as a first coolant discharge pipeline, the reversible distributor is connected to a second coolant discharge pipeline 11 which extends to the tool 5 and a third coolant discharge pipeline 12 extending to the coolant supply source 6. The distribution of the coolant from the cooling duct 3 can take place within the reversible distributor 10 into three switching positions I, II, III. In a first switching position I, all of the coolant flows through the second coolant discharge pipeline 11 to the tool 5. In a second switching position II, all of the coolant flows through the third coolant discharge pipeline 12 to the coolant supply source 6. In a third switching position III, part of the coolant is supplied over the second coolant discharge pipeline 11 to the tool 5 and the remainder of the coolant is supplied over the third coolant discharge pipeline 12 to the coolant supply source 6. To prevent coolant from flowing out of the tool 5 in switching position I of the reversible distributor 10, when the driving motor is at a lower level than the cooling supply source and the pump of the cooling supply source is not running, a shut-off valve 16 is provided within the housing 2 mounted on the cooling device 8 and can be controlled electrically via the electronic component 19 in the coolant supply pipeline 7. It is also possible to operate the shutoff valve 16 mechanically or electrically with the help of the control switch 15.

The equipment of the present invention for working a hard material can also be a wall saw with a liquid-cooled driving motor and two advancing motors, a first advancing motor moving the wall saw longitudinally and a second advancing motor interacting with a swivel arm, at which a tool in the form of a cutting blade of large area is located. The cutting blade has at its periphery several cutting elements with diamond particles. The coolant from the coolant supply source can be used to cool the two advancing motors before it flows into the cooling duct of the driving motor, cooling the latter.

In the region of the cooling device 8 within the housing 2 of the equipment, a temperature sensor can be arranged, not shown, which interrupts the external power supplied to the driving motor or reduces the advancing speed, especially for the longitudinal advance of the advancing motor, when the equipment is a wall saw. The wall saw is not shown in the drawing.

Though the present invention has been shown and described with reference to a preferred embodiment, such is merely illustrative of the present invention and is not to be construed as to be limited to the disclosed embodiment and/or details thereof, and the present invention includes all modifications, variations and/or alternate embodiments within the spirit and scope of the present invention as defined by the appended claims.

What is claimed is:

1. Equipment for working a hard material comprises a housing (2), a driving motor (1) located within said housing (2), a tool (5) connected to said driving motor (1) and arranged to work the material, a cooling duct (3) located within said housing in a region about said driving motor and having an upstream end and a downstream end, a coolant supply source (6) for supplying coolant under pressure, a coolant supply pipeline (7) conveying coolant from said supply source (6) to said cooling duct (3), a first coolant discharge pipeline (13) connected to the downstream end of said cooling duct (3) and spaced from said tool (5), a cooling device (8) connected to said coolant supply pipeline (7), and an electronic component (9) associated with said cooling device (8).

2. Equipment, set forth in claim 1, wherein said cooling device (8) comprises a basic member (9) formed of a material with good thermal conductivity properties, and said electronic component (19) is positioned on said cooling device.

3. Equipment, as set forth in claim 1, wherein said cooling device (8) is located in said housing (2).

4. Equipment, set forth in claim 3, wherein a flow monitor (14) is arranged on said cooling device (8).

5. Equipment, set forth in claim 4, wherein said flow monitor (14) is in operational connection with said electronic component (19).

6. Equipment, as set forth in claim 3, wherein said cooling device (8) is in operational connection with a shut-off valve (16) for controlling the supply of coolant to the driving motor (1).

7. Equipment, as set forth in claim 1, wherein a reversible distributor (10) is connected to the first coolant discharge pipeline (13) downstream from said cooling duct (3), a second cooling discharge pipeline (11) and a third coolant discharge pipeline (12) connected to said reversible distributor (10) with said second coolant discharge pipeline (11) connected to said tool (5), and said third coolant discharge pipeline (12) connected to said coolant supply source (6).

8. Equipment, as set forth in claim 7, wherein said reversible distributor (10) has three switching position (I, II, III), in a first switching position (I) all of the coolant is supplied through the second cooling discharge pipeline (11) to the tool, in a second switching position (II), all of the coolant is supplied via the third cooling discharge pipeline (12) to the coolant supply source (6) and in a third switching position (III), the coolant is supplied through the second cooling discharge pipeline to the tool (5) and through the third coolant discharge pipeline (12) to the coolant supply source (6).

9. Equipment, as set forth in claim 1, wherein said coolant supply source (6) is formed of coolant processing equipment.

10. Equipment, set forth in claim 9, wherein the coolant processing equipment is spaced separately from the housing (2).

* * * * *

UNITED STATES PATENT AND TRADEMARK OFFICE
CERTIFICATE OF CORRECTION

PATENT NO. : 6,220,046 B1
DATED : April 24, 2001
INVENTOR(S) : Ferdinand Kristen, et al.

It is certified that error appears in the above-identified patent and that said Letters Patent is hereby corrected as shown below:

<u>Title page,</u>
Item [75] should read as follows:

{75} Ferdinand Kristen, Gliching; Hans– Werner Bongers– Ambrosius, Munich, both of (DE), Josef Shittl, Thüringen; Erwin Reisinger, Seiersberg, both of (AT)

Item [30] should read as follows:

{30} October 9, 1998 (DE)     198 46 712

Signed and Sealed this

Eleventh Day of September, 2001

*Attest:*

*Attesting Officer*

NICHOLAS P. GODICI
*Acting Director of the United States Patent and Trademark Office*